(12) United States Patent
Meiri et al.

(10) Patent No.: US 11,151,049 B2
(45) Date of Patent: Oct. 19, 2021

(54) SYSTEM AND METHOD FOR DATA MIGRATION FROM A CAS STORAGE SYSTEM TO A NON-CAS STORAGE SYSTEM

(71) Applicant: EMC IP Holding Company, LLC, Hopkinton, MA (US)

(72) Inventors: David Meiri, Somerville, MA (US); Anton Kucherov, Dudley, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 68 days.

(21) Appl. No.: 16/662,772

(22) Filed: Oct. 24, 2019

(65) Prior Publication Data
US 2021/0124687 A1 Apr. 29, 2021

(51) Int. Cl.
| G06F 12/08 | (2016.01) |
| G06F 12/0891 | (2016.01) |
| G06F 12/1018 | (2016.01) |
| G06F 3/06 | (2006.01) |
| H04L 9/06 | (2006.01) |

(52) U.S. Cl.
CPC .......... *G06F 12/0891* (2013.01); *G06F 3/067* (2013.01); *G06F 3/0607* (2013.01); *G06F 3/0647* (2013.01); *G06F 3/0659* (2013.01); *G06F 12/1018* (2013.01); *H04L 9/0643* (2013.01)

(58) Field of Classification Search
CPC ............. G06F 12/0891; G06F 12/1018; G06F 3/0607; G06F 3/0647; G06F 3/0659; G06F 3/067
See application file for complete search history.

(56) References Cited

U.S. PATENT DOCUMENTS

| 7,409,512 | B1 * | 8/2008 | Kekre | G06F 11/2082 711/161 |
| 7,761,425 | B1 * | 7/2010 | Erickson | G06F 11/1464 707/649 |
| 7,788,220 | B1 * | 8/2010 | Auchmoody | G06F 16/10 707/609 |
| 7,958,101 | B1 * | 6/2011 | Teugels | G06F 16/168 707/705 |
| 10,409,520 | B1 * | 9/2019 | Meiri | G06F 3/067 |
| 10,496,668 | B1 * | 12/2019 | Meiri | G06F 16/2255 |
| 10,503,609 | B1 * | 12/2019 | Stronge | G06F 16/27 |
| 2003/0046490 | A1 * | 3/2003 | Busser | G06F 3/0607 711/114 |
| 2007/0266059 | A1 * | 11/2007 | Kitamura | G06F 16/907 |
| 2012/0017060 | A1 * | 1/2012 | Kapanipathi | G06F 3/065 711/162 |
| 2012/0317353 | A1 * | 12/2012 | Webman | G06F 3/0613 711/108 |
| 2012/0317395 | A1 * | 12/2012 | Segev | G06F 16/275 711/216 |

(Continued)

*Primary Examiner* — Ryan Bertram
(74) *Attorney, Agent, or Firm* — Brian J. Colandreo; Mark H. Whittenberger; Holland & Knight LLP

(57) ABSTRACT

A method, computer program product, and computer system for invalidating, by a target, all data in a first volume. A source may scan a hash to address table for a second volume to be migrated to the first volume. Data in the second volume may be migrated to be stored in the first volume by pushing information from the hash to address table to the target.

18 Claims, 5 Drawing Sheets

(56) References Cited

U.S. PATENT DOCUMENTS

| | | | |
|---|---|---|---|
| 2013/0064052 A1* | 3/2013 | Mehra | G06F 3/0611 |
| | | | 369/30.01 |
| 2014/0082273 A1* | 3/2014 | Segev | G11C 15/00 |
| | | | 711/108 |
| 2014/0281306 A1* | 9/2014 | Nakajima | G06F 3/0683 |
| | | | 711/162 |
| 2017/0185326 A1* | 6/2017 | Meiri | G06F 3/067 |
| 2018/0232164 A1* | 8/2018 | Jibbe | G06F 3/0632 |

* cited by examiner

A2H Table 500

| Address | Hash |
|---|---|
| 000 | XX1 |
| 001 | XYZ |
| 01a | ABF |
| 01b | ABF |
| 01c | XX1 |
| 028 | ABF |
| 029 | DEF |
| 038 | XX1 |

Corresponding H2A Table 502

| Signature | Address(es) |
|---|---|
| ABF | 01a, 01b, 028 |
| DEF | 029 |
| XX1 | 000, 01c, 038 |
| XYZ | 001 |

Partial H2A Table for Hash with Prefix "X" 504

| Signature | Address(es) |
|---|---|
| XX1 | 000, 01c, 038 |
| XYZ | 001 |

FIG. 5

SYSTEM AND METHOD FOR DATA MIGRATION FROM A CAS STORAGE SYSTEM TO A NON-CAS STORAGE SYSTEM

BACKGROUND

Data migration between storage systems may be beneficial for multiple reasons. For example, one type of storage system may be outdated, and so the data may be better served by being stored on a newer storage system. Some storage systems may be Contents Addressable Storage (CAS). In that type of system, data may be organized by hash signatures in the back-end (e.g., backend D modules), while control modules (C) may implement address-to-hash (A2H) lookup. Routing tables (R) may handle host I/Os and transmit them to the C modules. Many addresses may use the same data page, which is stored once in the back-end.

BRIEF SUMMARY OF DISCLOSURE

In one example implementation, a method, performed by one or more computing devices, may include but is not limited to invalidating, by a target, all data in a first volume. A source may scan a hash to address table for a second volume to be migrated to the first volume. Data in the second volume may be migrated to be stored in the first volume by pushing information from the hash to address table to the target.

One or more of the following example features may be included. The information from each entry of the hash to address table may include a hash signature, a data page, and a list of addresses associated with the data page. Migrating the data in the second volume to be stored in the first volume by pushing the information from the hash to address table to the target may include using a write command for each page in the hash to address table. Migrating the data in the second volume to be stored in the first volume by pushing the information from the hash to address table to the target may include using a write command for each page in the hash to address table, wherein the write command may include a payload of the data page and a list of addresses where the data page is to be written. Migrating the data in the second volume to be stored in the first volume by pushing the information from the hash to address table to the target may include matching a page in an address to hash table to the hash to address table. Migrating the data in the second volume to be stored in the first volume by pushing the information from the hash to address table to the target may include dynamically building the hash to address table using a prefix, wherein the hash to address table only includes hash signatures that start with the prefix. Only content from an address to hash table may be sent to the target from the source.

In another example implementation, a computing system may include one or more processors and one or more memories configured to perform operations that may include but are not limited to invalidating, by a target, all data in a first volume. A source may scan a hash to address table for a second volume to be migrated to the first volume. Data in the second volume may be migrated to be stored in the first volume by pushing information from the hash to address table to the target.

One or more of the following example features may be included. The information from each entry of the hash to address table may include a hash signature, a data page, and a list of addresses associated with the data page. Migrating the data in the second volume to be stored in the first volume by pushing the information from the hash to address table to the target may include using a write command for each page in the hash to address table. Migrating the data in the second volume to be stored in the first volume by pushing the information from the hash to address table to the target may include using a mite command for each page in the hash to address table, wherein the write command may include a payload of the data page and a list of addresses where the data page is to be written. Migrating the data in the second volume to be stored in the first volume by pushing the information from the hash to address table to the target may include matching a page in an address to hash table to the hash to address table. Migrating the data in the second volume to be stored in the first volume by pushing the information from the hash to address table to the target may include dynamically building the hash to address table using a prefix, wherein the hash to address table only includes hash signatures that start with the prefix. Only content from an address to hash table may be sent to the target from the source.

In another example implementation, a computer program product may reside on a computer readable storage medium having a plurality of instructions stored thereon which, when executed across one or more processors, may cause at least a portion of the one or more processors to perform operations that may include but are not limited to invalidating, by a target, all data in a first volume. A source may scan a hash to address table for a second volume to be migrated to the first volume. Data in the second volume may be migrated to be stored in the first volume by pushing information from the hash to address table to the target.

One or more of the following example features may be included. The information from each entry of the hash to address table may include a hash signature, a data page, and a list of addresses associated with the data page. Migrating the data in the second volume to be stored in the first volume by pushing the information from the hash to address table to the target may include using a write command for each page in the hash to address table. Migrating the data in the second volume to be stored in the first volume by pushing the information from the hash to address table to the target may include using a write command for each page in the hash to address table, wherein the write command may include a payload of the data page and a list of addresses where the data page is to be written. Migrating the data in the second volume to be stored in the first volume by pushing the information from the hash to address table to the target may include matching a page in an address to hash table to the hash to address table. Migrating the data in the second volume to be stored in the first volume by pushing the information from the hash to address table to the target may include dynamically building the hash to address table using a prefix, wherein the hash to address table only includes hash signatures that start with the prefix. Only content from an address to hash table may be sent to the target from the source.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 5 is an example diagrammatic view of an address to hash table, a corresponding hash to address table, and a partial hash to address table for a hash with a prefix "X" according to one or more example implementations of the disclosure.

Like reference symbols in the various drawings indicate like elements.

DETAILED DESCRIPTION

Figure 1:
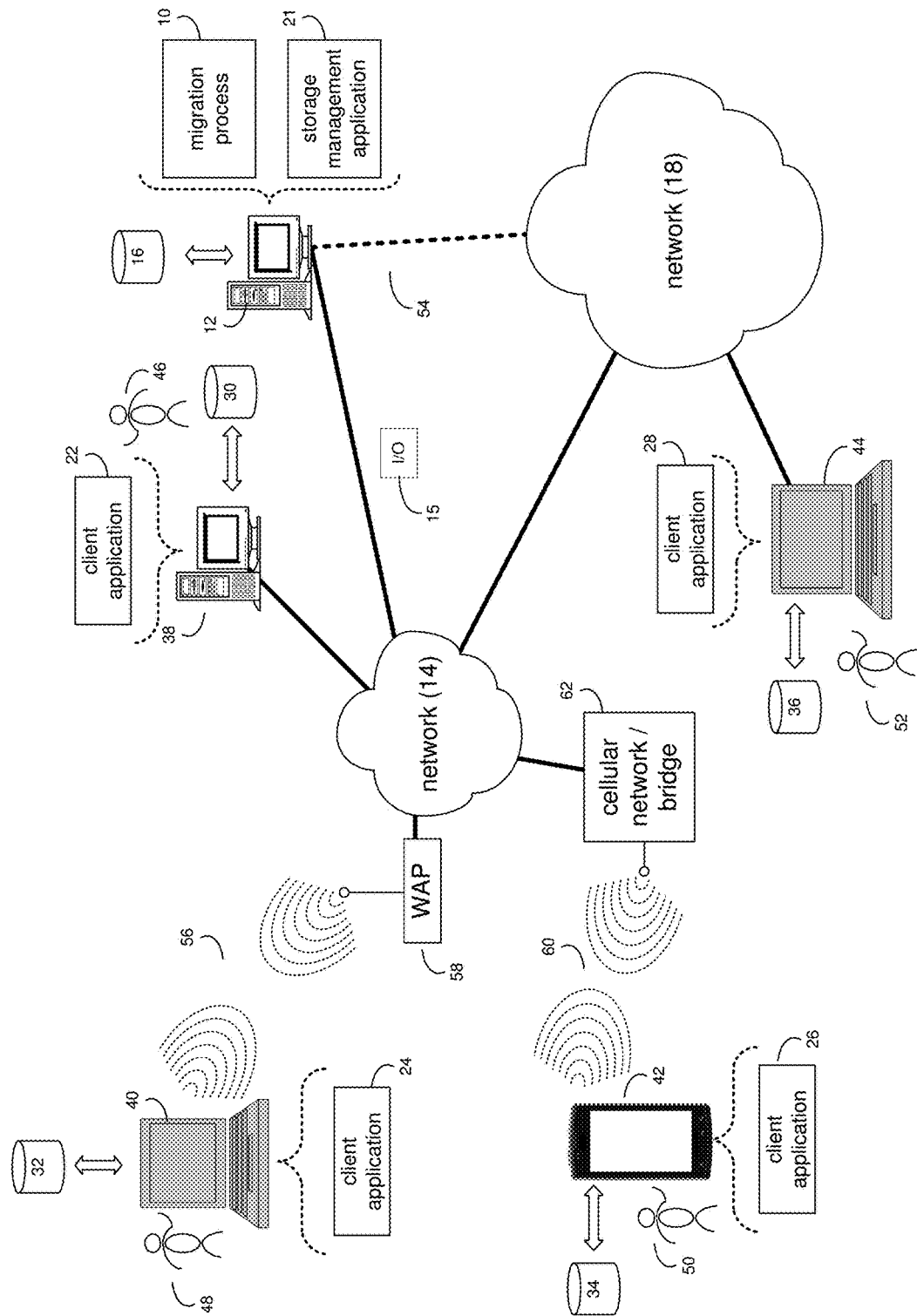
FIG. 1 is an example diagrammatic view of a migration process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the Internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) r ray occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown migration process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a migration process, such as migration process 10 of FIG. 1, may invalidate, by a target, all data in a first volume. A source may scan a hash to address table for a second volume to be migrated to the first volume. Data in the second volume may be migrated to be stored in the first volume by pushing information from the hash to address table to the target.

In some implementations, the instruction sets and subroutines of migration process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, migration process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, migration process 10 and/or storage management application 21 may be accessed via one or more of client applications 22, 24, 26, 28. In some implementations, migration process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within migration process 10, a component of migration process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of migration process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of migration process 10 (and vice versa). Accordingly, in some implementations, migration process 10 may be a purely server-side application, a purely client-side application, or a hybrid server-side/client-side application that is cooperatively executed by one or more of client applications 22, 24, 26, 28 and/or migration process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, migration process 10, and storage management application 21, taken singly or in any combination, may effectuate some or all of the same functionality, any description of effectuating such functionality via one or more of client applications 22, 24, 26, 28, migration process 10, storage management application 21, or combination thereof, and any described interaction(s) between one or more of client applications 22, 24, 26, 28, migration process 10, storage management application 21, or combination thereof to effectuate such functionality, should be taken as an example only and not to limit the scope of the disclosure.

In some implementations, one or more of users 46, 48, 50, 52 may access computer 12 and migration process 10 (e.g., using one or more of client electronic devices 38, 40, 42, 44) directly through network 14 or through secondary network 18. Further, computer 12 may be connected to network 14 through secondary network 18, as illustrated with phantom link line 54. Migration process 10 may include one or more user interfaces, such as browsers and textual or graphical user interfaces, through which users 46, 48, 50, 52 may access migration process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
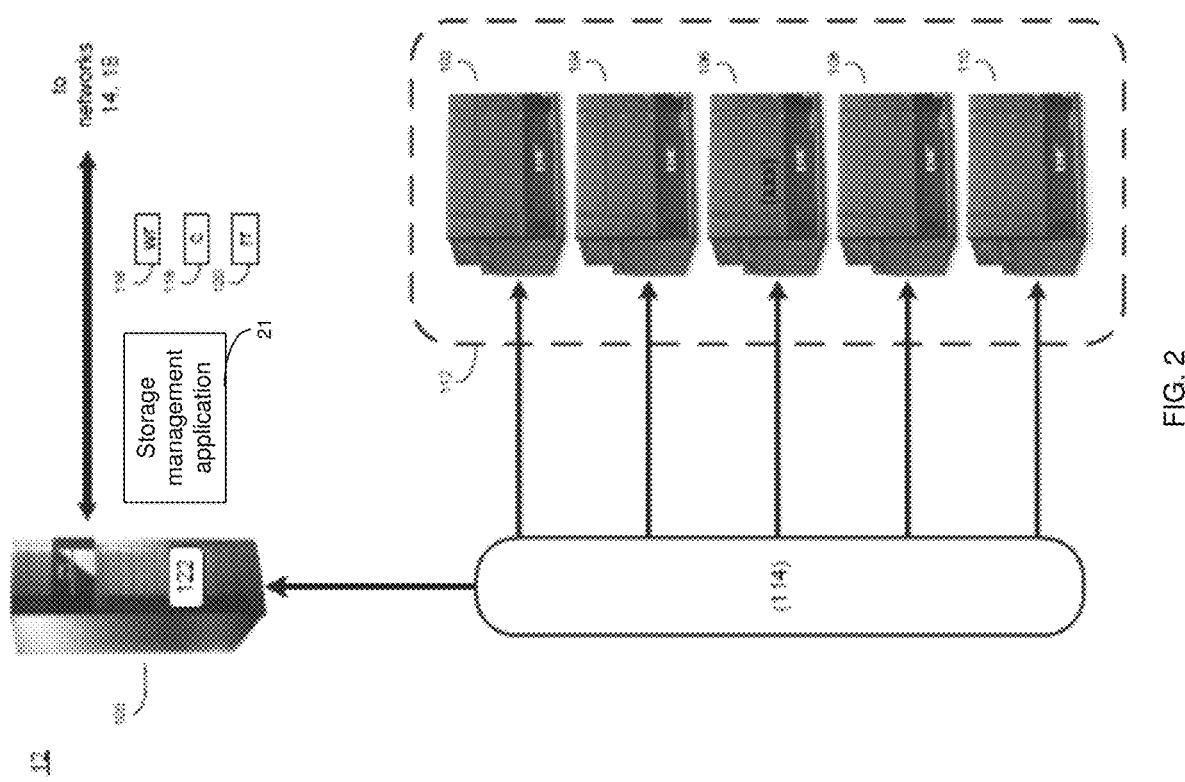
FIG. 2 is an example diagrammatic view of a storage system of FIG. 1 according to one or more example implementations of the disclosure.
Figure 3:
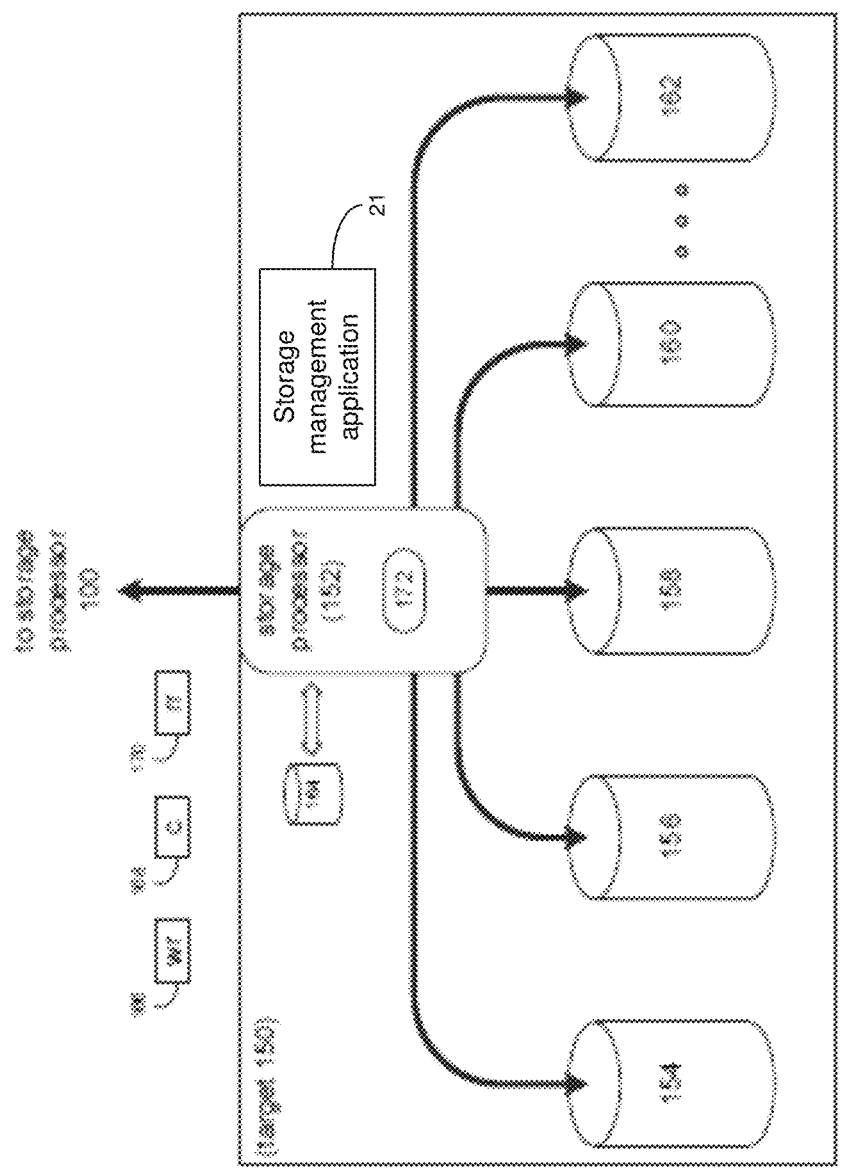
FIG. 3 is an example diagrammatic view of a storage target of FIG. 1 according to one or more example implementations of the disclosure.

Data Storage System:

Referring also to the example implementation of FIGS. 2-3 where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data, Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or migration process 10) may be executed by one or more processors and one or more memory architectures included with data array 112.

In some implementations, storage processor 100 may include front end cache memory system 122. Examples of front end cache memory system 122 may include but are not lii cited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system a flash-based, cache memory system). During operation of storage processor 152, content 168 to be written to target 150 may be received by storage processor 152 (e.g., via storage management process 21) and initially stored (e.g., via storage management process 21) within front end cache memory system 172.

In a Content Addressable Storage (CAS) array, data is generally stored in blocks, for example of 4 KB or 16 KB, where each block has a unique large hash signature, for example of 20 bytes, saved on memory. Hash signatures may be accessed by small in-memory handles (e.g., short hash handles), for example of 5 bytes. These handles may be unique to each array, but not necessarily unique across arrays. When replicating between two CAS arrays, it may be much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from memory, since the short hash handles are not unique, they cannot be easily used to check if a target contains a hash signature. In some implementations, short hash handles are shortcuts for hash signatures, and can give a reliable hint of the existence of a hash signature in an array. While the description describes using this approach with de-duplication storage devices, it would be appreciated by one of ordinary skill in the art that the approach described herein may be used with any type of storage device including those that do not use de-duplication.

Data migration between storage systems may be beneficial for multiple reasons. For example, one type of storage system may be outdated, and so the data may be better served by being stored on a newer storage system. Some storage systems may be Contents Addressable Storage (CAS). In that type of system, data may be organized by hash signatures in the back-end (e.g., backend D modules), while control modules (C) may implement address-to-hash (A2H) lookup. Generally, a read request to an address A may be serviced by first looking up the address in an A2H table, finding the corresponding hash signature, and then finding the data associated with this hash signature. Routing tables (R) may handle host I/Os and transmit them to the C modules. Many addresses may use the same data page, which is stored once in the back-end. Generally, volumes and/or snapshots may be represented using one or more A2H tables, which may include zero or more entries each having an "Address" value and a corresponding "Hash" value. For a given table entry, the Address value corresponds to an I/O address used by a client to read/write a chunk of data, and the Hash value corresponds to a hash value calculated over the chunk data. Thus, for example, within a volume/snapshot, the chunk stored at I/O address "0" may have a hash value of "abc." However, it should be understood that hash values may be represented as more than 3 characters and in any suitable format (e.g., 160-bit values in the case of SHA-1). An A2H table may be associated with a volume number and/or snapshot identifier managed. In the example, the A2H table 200 is associated with LUN "0."

Migrating from a CAS system to a traditional storage system, or even a storage system that supports deduplication, may be inefficient (e.g., since migration may typically run as a "Pull" from the new system, progressing along address ranges. This means a sequential read process that reads from the donor (source storage system) with no regard to deduplicated data in the donor, and as such, the same page needs to be read from the backend again and again, thereby wasting resources. Additionally, "Pull" migration ignores zero pages. For example, consider a 16 GB volume composed of 1M pages of 16 KB each. It is likely that many of the 1M pages are 0, and a normal read process will end up reading a lot of zeroes, which is wasteful. Even if "Push" migration from the source is used, there is still no regard to data duplication. This means that the same page may be read many times from the source's back-end, the same page may be sent many times over the data links between the storage systems, and this may result in a much longer migration process, consuming more resources. Therefore, as will be discussed below, the present disclosure may enable a push technique (instead of a pull technique) in the source system. In some implementations, the present disclosure may focus on offline data migration, where it is assumed that the volume is immutable and cannot be modified by the host during the entire migration process.

Figure 4:
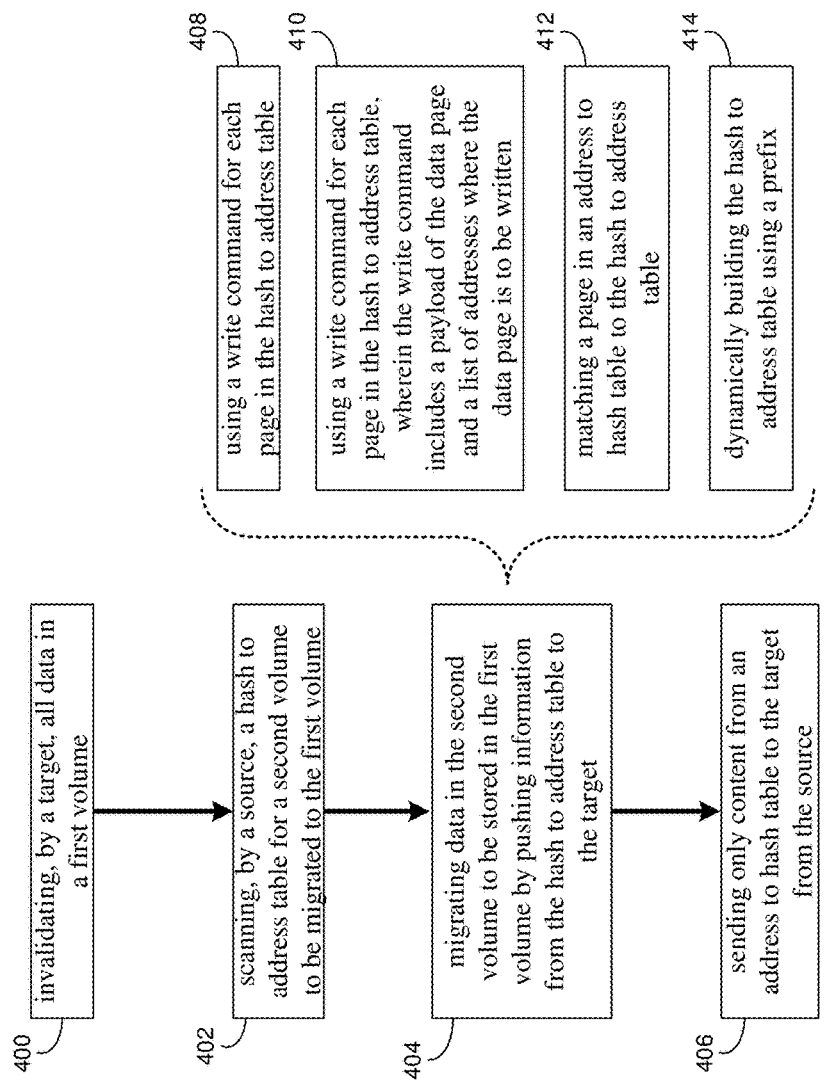
FIG. 4 is an example flowchart of a migration process according to one or more example implementations of the disclosure.

The Migration Process:

As discussed above and referring also at least to the example implementations of FIGS. 4-5, migration process (MP) 10 may invalidate 400, by a target, all data in a first volume. MP 10 may scan 402, by a source, a hash to address table for a second volume to be migrated to the first volume. MP 10 may migrate 404 data in the second volume to be stored in the first volume by pushing information from the hash to address table to the target.

In some implementations, MP 10 may send 406 (from the source) only content from an address to hash (A2H) table to the target. For example, one of the above-noted problems (of migrating zeroes) may be addressed by virtue of the sparse metadata allocation scheme of the Address to Hash (A2H) table (where an example A2H table 500 is shown in the example implementation of FIG. 5). In other words, since the A2H tables have entries only for data written by the host, and do not have entries for zeroed pages, by traversing the A2H tables in the source and sending 406 their contents, any zeroed pages will be ignored. By only sending non-zero pages, it can be assumed that every page that is not sent to the target is a zero page. As an example, MP 10 may (e.g., via the target system) zero a volume, or mark all its data as zero (i.e., all data on the volume is invalidated). The source system (e.g., via MP 10) may then push all the data from the A2H table to the target. When the push is complete, migration is complete.

Another of the above-noted problems (e.g., reading deduplicated data exactly once) may also be addressed by MP 10. Typically, CAS systems do not support the opposite of A2H table. As such, MP 10 may be able, given a hash signature, to find all addresses that use that hash. This may generally be referred to as Hash to Address or H2A (where an example corresponding H2A table 502 is shown in the example implementation of FIG. 5). For example, in some implementations, MP 10 may invalidate 400, by a target, all data in a first volume, and in some implementations, MP 10 may scan 402, by a source, a hash to address table for a second volume to be migrated to the first volume. For instance, this may be similar to what is described above, except that instead of scanning an A2H table, MP 10 may scan 402 an H2A table for the volume or a set of volumes to be migrated. In the example, the target system (e.g., via MP 10) may zero a volume, or mark all its data as zero (i.e., all data is invalidated 400). In some implementations, the source system (e.g., via MP 10) may prepare a "reverse" of the A2H table, resulting in an H2A table for the migrated volume. Its function may be to translate a hash to a list of addresses using that hash.

In some implementations, MP 10 may migrate 404 data in the second volume to be stored in the first volume by pushing information from the hash to address table to the target, where in some implementations, the information from each entry of the hash to address table may include a hash signature, a data page, and a list of addresses associated with the data page. For example, the source (e.g., via MP 10) may traverse the above-noted H2A. For each entry, there may be a hash signature, data page, and a list of addresses. The source (e.g., via MP 10) may send all this information to the target, in one of several techniques described below single command or multiple commands). When the push is complete, migration 404 is complete.

When preparing the H2A table for the migrated volume, the source may have a list of addresses all having the same data, and a single page that represents this data. The source may send this to the target. In some implementations, migrating the data in the second volume to be stored in the first volume by pushing the information from the hash to address table to the target may include using 408 a write command for each page in the hash to address table. For example, MP 10 may use 408 a standard SCSI (or other write) command as a write command for each page. For instance, even though MP 10 will be sending the same data again and again, MP 10 may be sending it in an order that makes it possible for the target (e.g., via MP 10) to recognize the duplicates and handle them efficiently. For example, as described above, when using a H2A table to scan the volume, if a hash appears in multiple addresses, the same page may be sent again and again for all these addresses. For example, if the hash signature corresponds to 10 addresses, the source (storage system) may send the same page 10 times, every time with a different address. The target (storage system) may receive the same data 10 times. This makes it easier for the target to identify the duplication. For example, some targets that are not CAS based may have a small deduplication database, for example, for the last 1000 pages seen. Specifically, where the deduplication cache (or hash signature cache) is limited, the target (e.g., via MP 10) may deduplicate all pages after the first one. This may always be the technique used if the page appears once. The other benefit of this approach is that the data is read once from the source, instead of once per occurrence.

In some implementations, migrating the data in the second volume to be stored in the first volume by pushing the information from the hash to address table to the target may include using 410 a write command for each page in the hash to address table, wherein the write command may include a payload of the data page and a list of addresses where the data page is to be written. For example, MP 10 may use 410 a custom SCSI (or other write) command, that includes as its payload the page of data, followed by an extra SCSI block containing a list of addresses where this page should be written. For example, if a page size is 16 KB, the SCSI command may have a payload of 16.5 KB, where the additional 512 bytes contain a list of Logical Unit/Logical Block Address (LBA) identifiers for all locations where this page needs to be written. This technique may have all the advantages of using 408 a standard SCSI command as a write command for each page, and in additional, may transmit the page only once (since the command includes the list of addresses where the page should be written).

In some implementations, migrating the data in the second volume to be stored in the first volume by pushing the information from the hash to address table to the target may include matching 412 a page in an address to hash table to the hash to address table. For example, in some implementations, the source (e.g., via MP 10) may scan the A2H table. For each page, MP 10 may consult the H2A table to see if the page appears in other places in the A2H table (i.e., if the hash signature for the page in the A2H table matches 412 the hash signature for the page in the H2A table). If there is a match, MP 10 may jump to these other locations in the A2H table and may push them to the target as well, and may then mark them as done. For example, a matching entry in an A2H table may be an entry for another address with the same hash signature. In some implementations, instead of scanning the H2A table, MP 10 may scan the A2H table but once an entry in A2H table is found that has not yet been sent to the target, MP 10 may send it alongside all the other entries that have the same address. Notably, this technique does not require the custom SCSI write command described above, and may have the same savings as described above (e.g., read data once, improve deduplication on target, etc.) However, deduplicated data is still sent multiple times over the communication links between the source and the target.

In some implementations, migrating the data in the second volume to be stored in the first volume by pushing the information from the hash to address table to the target may include dynamically building 414 the hash to address table using a prefix, wherein the hash to address table only includes hash signatures that start with the prefix (where an example partial H2A table 504 for a hash with prefix "X" is shown in the example implementation of FIG. 5). For example, in some implementations, the H2A table may be built 414 dynamically, per migrated volume (or set of volumes). For instance, if there is a limited amount of memory, the table may be built in sections. For example, assume for example purposes only that there is only enough memory to build about ⅛ of the H2A table. In this example, MP 10 may set a, 3-bit hash prefix (e.g., 000) and may build the H2A table for this prefix (meaning, include only hash signatures that start with this prefix). MP 10 may perform migration as described above, but where the ⅛ of the volume will be migrated. Once this is complete, MP 10 may increase the prefix by 1 (e.g., 001), and may determine if the prefix is still in the range 000-111. If the prefix is still in the range 000-111, MP 10 may build the H2A table for this prefix (meaning, include only hash signatures that start with this prefix). MP 10 may perform migration as described above, where the next ⅛ of the volume will be migrated, and so on until the prefix is no longer in the range 000-111, meaning that migration is now complete. In other words, MP 10 may run the migration 8 times, each time for ⅛ of the pages, where the pages are divided into 8 groups based on their hash signatures. This may guarantee that the full benefits of deduplication is achieved. Notably, while more CPU time may be needed to build each of the H2A tables and scanning the A2H tables, when compared with the time spent reading data from the backend and sending it over the data communication link, the cost of the additional work may be negligible.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
 invalidating, by a target, all data in a first volume;
 scanning, by a source, a hash to address table for a second volume to be migrated to the first volume; and migrating data in the second volume to be stored in the first volume by pushing information from the hash to address table to the target, wherein migrating the data in the second volume to be stored in the first volume by pushing the information from the hash to address table to the target includes matching a page in an address to hash table to the hash to address table.

2. The computer-implemented method of claim 1 wherein the information from each entry of the hash to address table includes a hash signature, a data page, and a list of addresses associated with the data page.

3. The computer-implemented method of claim 1 wherein migrating the data in the second volume to be stored in the first volume by pushing the information from the hash to address table to the target includes using a write command for each page in the hash to address table.

4. The computer-implemented method of claim 1 wherein migrating the data in the second volume to be stored in the first volume by pushing the information from the hash to address table to the target includes using a write command for each page in the hash to address table, wherein the write command includes a payload of the data page and a list of addresses where the data page is to be written.

5. The computer-implemented method of claim 1 wherein migrating the data in the second volume to be stored in the first volume by pushing the information from the hash to address table to the target includes dynamically building the hash to address table using a prefix, wherein the hash to address table only includes hash signatures that start with the prefix.

6. The computer-implemented method of claim 1 further comprising sending only content from an address to hash table to the target from the source.

7. A computer program product residing on a non-transitory computer readable storage medium having a plurality of instructions stored thereon which, when executed across one or more processors, causes at least a portion of the one or more processors to perform operations comprising:
   invalidating, by a target, all data in a first volume;
   scanning, by a source, a hash to address table for a second volume to be migrated to the first volume; and
   migrating data in the second volume to be stored in the first volume by pushing information from the hash to address table to the target, wherein migrating the data in the second volume to be stored in the first volume by pushing the information from the hash to address table to the target includes matching a page in an address to hash table to the hash to address table.

8. The computer program product of claim 7 wherein the information from each entry of the hash to address table includes a hash signature, a data page, and a list of addresses associated with the data page.

9. The computer program product of claim 7 wherein migrating the data in the second volume to be stored in the first volume by pushing the information from the hash to address table to the target includes using a write command for each page in the hash to address table.

10. The computer program product of claim 7 wherein migrating the data in the second volume to be stored in the first volume by pushing the information from the hash to address table to the target includes using a write command for each page in the hash to address table, wherein the write command includes a payload of the data page and a list of addresses where the data page is to be written.

11. The computer program product of claim 7 wherein migrating the data in the second volume to be stored in the first volume by pushing the information from the hash to address table to the target includes dynamically building the hash to address table using a prefix, wherein the hash to address table only includes hash signatures that start with the prefix.

12. The computer program product of claim 7 wherein the operations further comprise sending only content from an address to hash table to the target from the source.

13. A computing system including:
   one or more memories; and
   one or more processors configured to perform operations comprising:
      invalidating, by a target, all data in a first volume;
      scanning, by a source, a hash to address table for a second volume to be migrated to the first volume; and
      migrating data in the second volume to be stored in the first volume by pushing information from the hash to address table to the target, wherein migrating the data in the second volume to be stored in the first volume by pushing the information from the hash to address table to the target includes matching a page in an address to hash table to the hash to address table.

14. The computing system of claim 13 wherein migrating the data in the second volume to be stored in the first volume by pushing the information from the hash to address table to the target includes using a write command for each page in the hash to address table.

15. The computing system of claim 13 wherein migrating the data in the second volume to be stored in the first volume by pushing the information from the hash to address table to the target includes using a write command for each page in the hash to address table, wherein the write command includes a payload of the data page and a list of addresses where the data page is to be written.

16. The computing system of claim 13 wherein migrating the data in the second volume to be stored in the first volume by pushing the information from the hash to address table to the target includes dynamically building the hash to address table using a prefix, wherein the hash to address table only includes hash signatures that start with the prefix.

17. The computing system of claim 13 wherein the operations further comprise sending only content from an address to hash table to the target from the source.

18. A computer-implemented method comprising:
   invalidating, by a target, all data in a first volume;
   scanning, by a source, a hash to address table for a second volume to be migrated to the first volume; and
   migrating data in the second volume to be stored in the first volume by pushing information from the hash to address table to the target, wherein migrating the data in the second volume to be stored in the first volume by pushing the information from the hash to address table to the target includes dynamically building the hash to address table using a prefix, wherein the hash to address table only includes hash signatures that start with the prefix.

* * * * *